July 19, 1966   R. J. HARTMEISTER   3,261,281
CONTINUOUS PRINTER AND TRANSFER UNIT
Filed Jan. 25, 1965   6 Sheets-Sheet 3

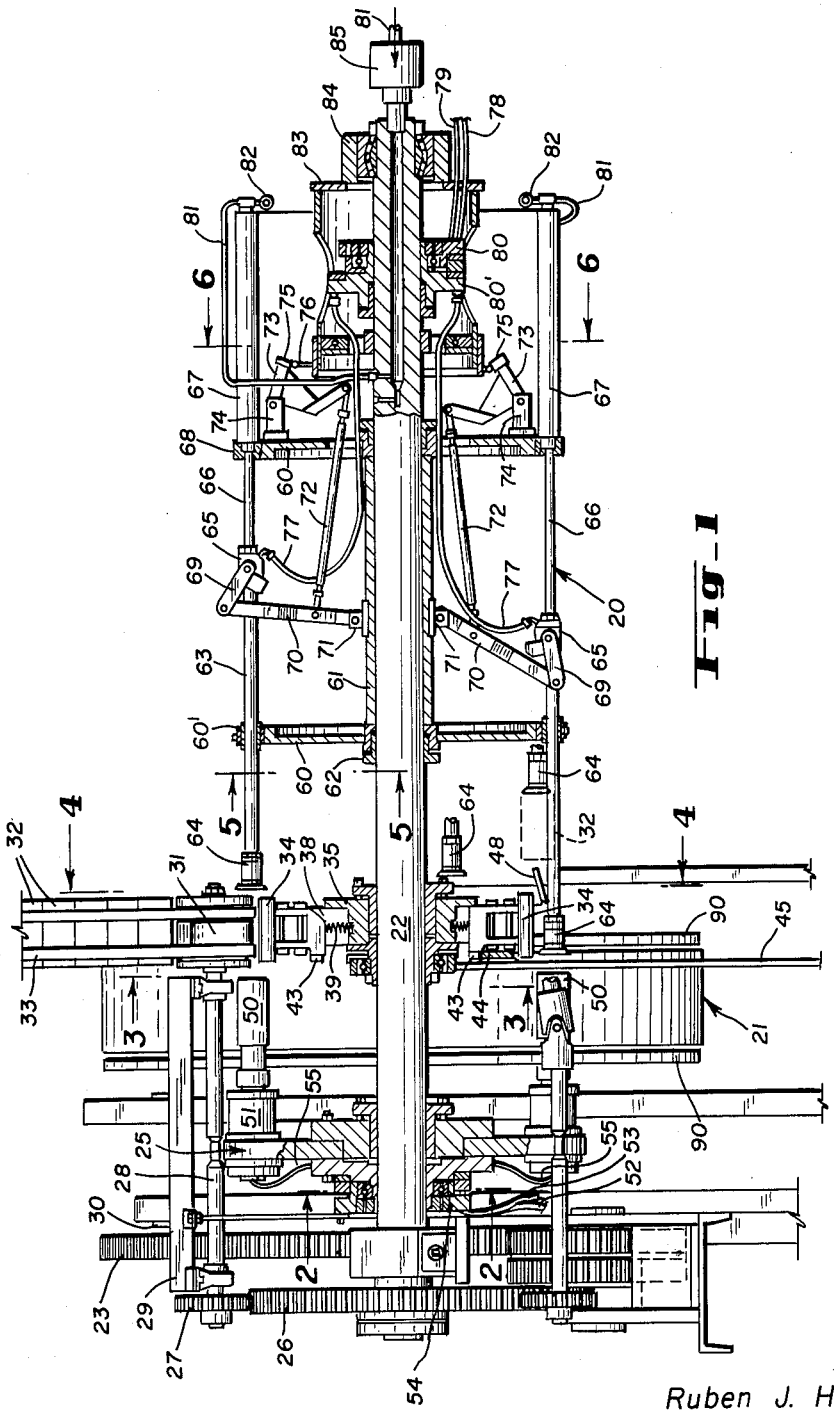
INVENTOR.
Ruben J. Hartmeister

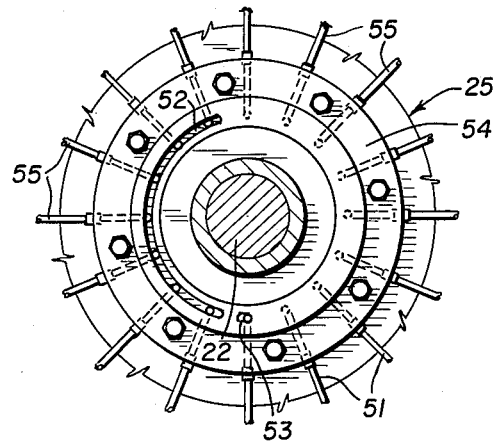
Fig_2
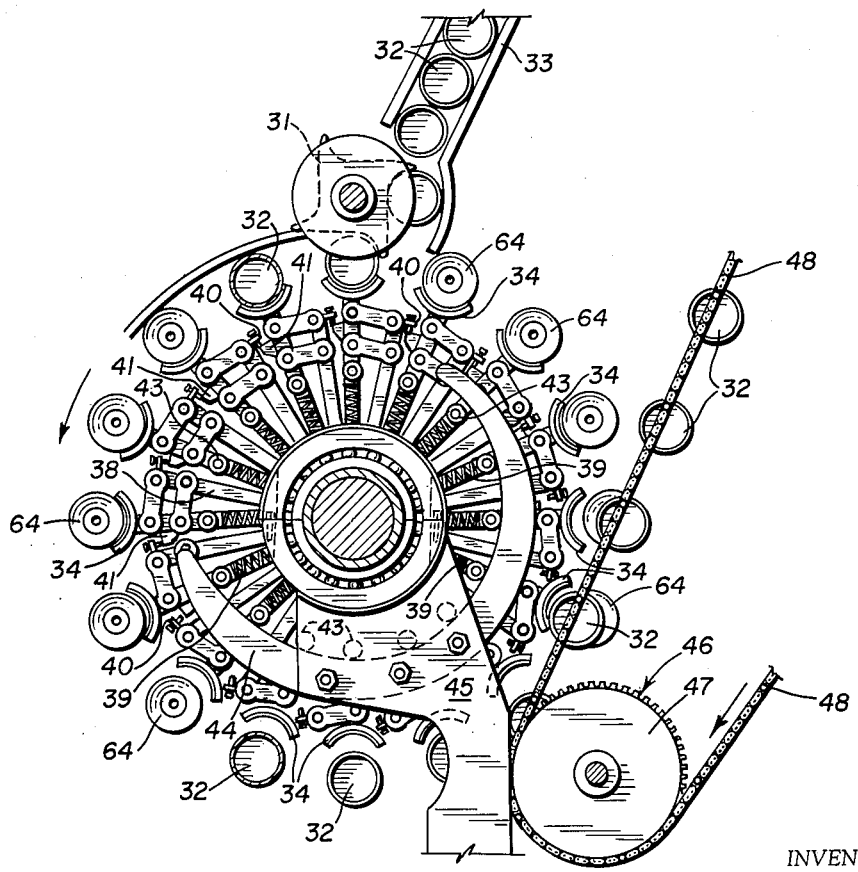
Fig_3

INVENTOR.
Ruben J. Hartmeister
BY
Bertha L. MacGregor
ATTORNEY

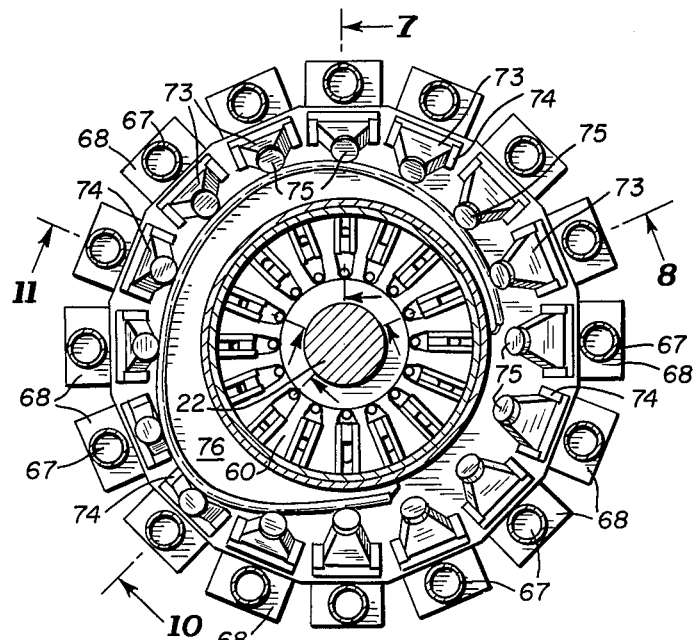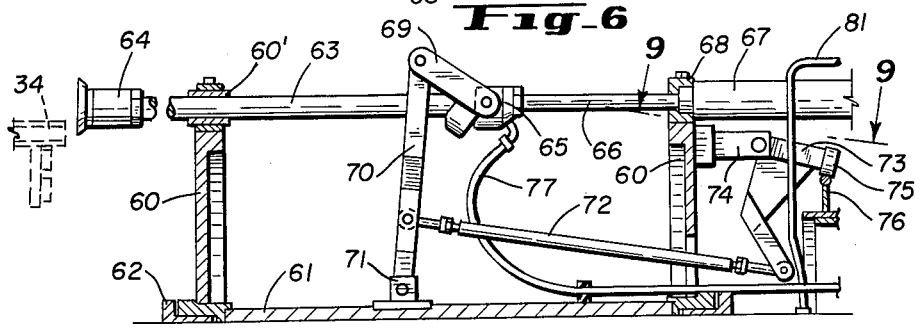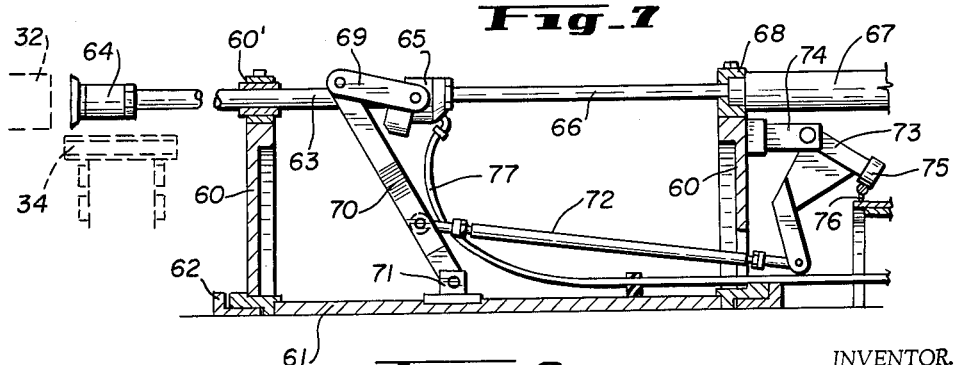

July 19, 1966   R. J. HARTMEISTER   3,261,281
CONTINUOUS PRINTER AND TRANSFER UNIT
Filed Jan. 25, 1965   6 Sheets-Sheet 5
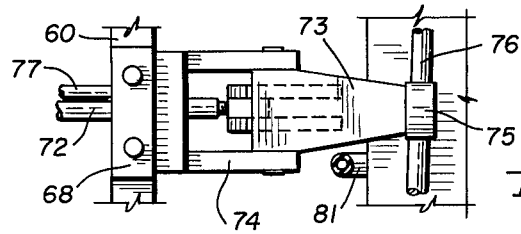
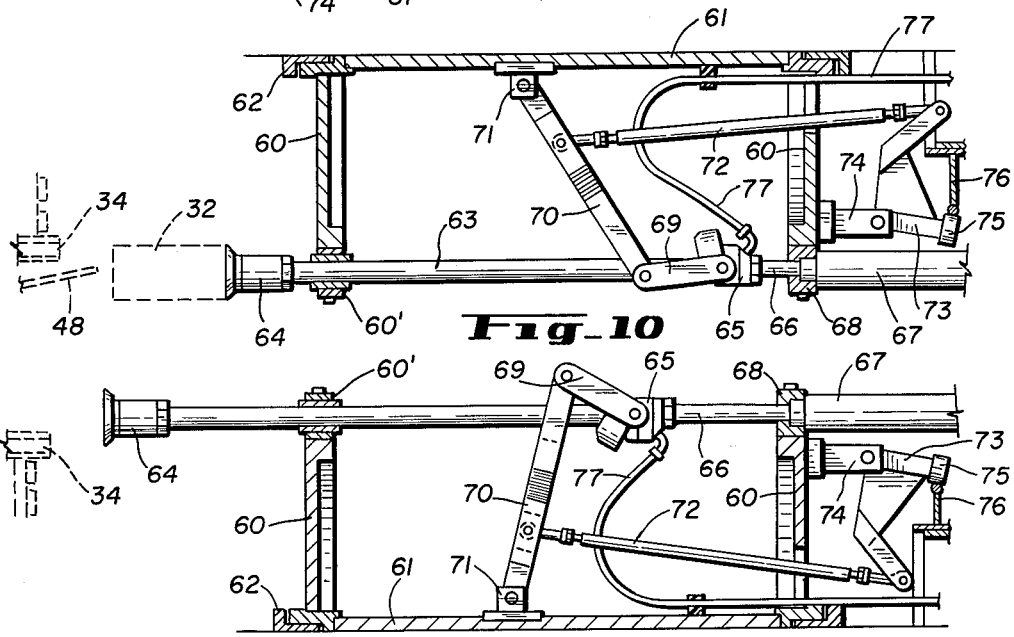
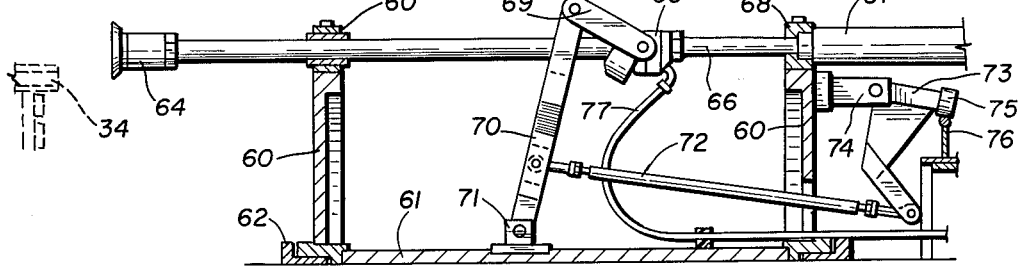
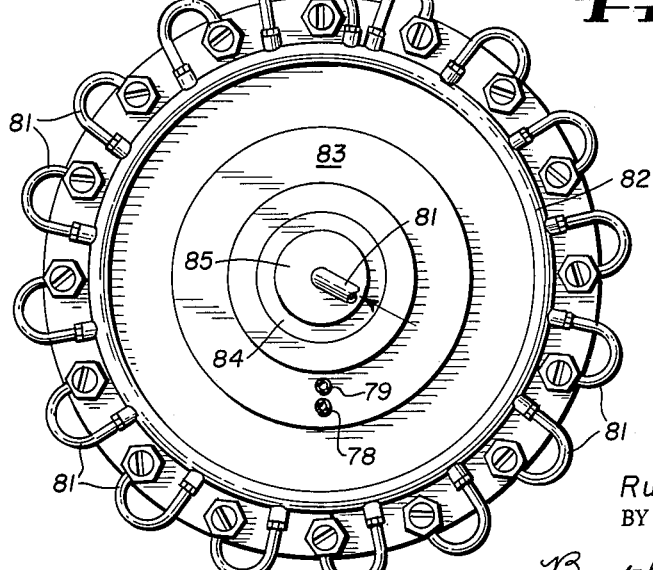
INVENTOR.
Ruben J. Hartmeister
BY
Bertha L. MacGregor
ATTORNEY

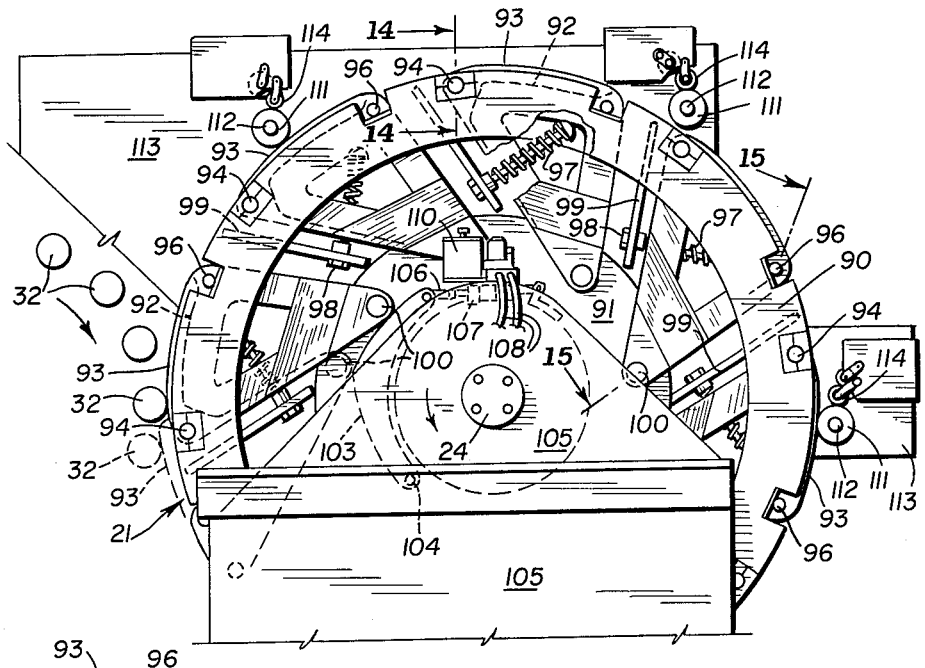
Fig_13
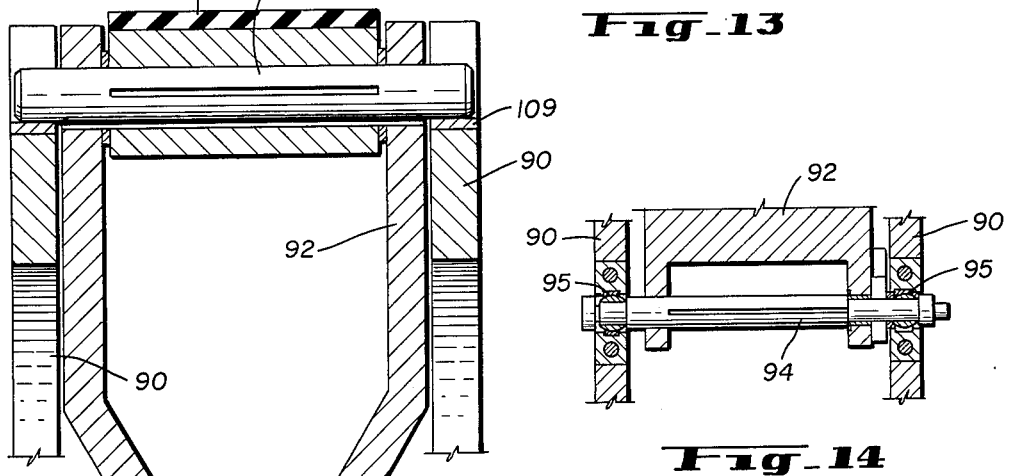
Fig_14
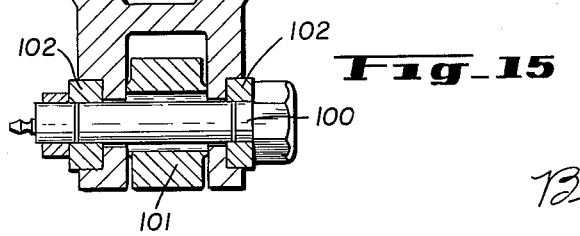
Fig_15

United States Patent Office 3,261,281
Patented July 19, 1966

3,261,281
CONTINUOUS PRINTER AND TRANSFER UNIT
Ruben J. Hartmeister, Golden, Colo., assignor to Coors Porcelain Company, Golden, Colo., a corporation of Colorado
Filed Jan. 25, 1965, Ser. No. 427,559
15 Claims. (Cl. 101—37)

This invention relates to a continuous printer and transfer unit for placing containers on mandrels or other holding means in position for printing on the containers, followed by removal of the containers from the mandrels or other holding means and placing them on a peg-carrying chain or a conveyor for subsequent operations thereon. In the embodiment of the invention shown and described herein, the containers are cylindrical cans which receive printing on their cylindrical surfaces while they are mounted on mandrels.

The main object of the invention is to produce a combination printer and transfer mechanism which performs the loading of cans on mandrels from a supply line, preparatory of the printing operation, followed by the printing step and the unloading of the cans from the mandrels, and placement thereof on a chain or conveyor for subsequent handling, in a continuous high speed operation wherein five hundred or more cans per minute are printed and transferred.

Another object of the invention is to provide pockets for supporting cans in axial alignment with the mandrels on which they are to be held for the printing operation, and means for retracting the pockets before withdrawal of the cans from the mandrels after being printed in order to prevent contact between the pockets and the printed surfaces.

Another object of the invention is to provide suction means associated with the mandrels for holding cans in print-receiving positions after they have been mechanically pushed on the mandrels.

Another object of the invention is to provide a plurality of push rods, a plurality of mandrels, and a plurality of container supporting pockets, the devices of each group being located in an annular path, and the several groups being in different annular paths, concentric with each other. Further, each push rod is axially aligned with a mandrel, and each pocket is located so that a can supported thereon is axially aligned with a mandrel and a push rod and is located between them. In the present embodiment sixteen each of the mandrels, pockets and push rods are shown, but the number may vary, provided a push rod and a mandrel are provided for each pocket, and all cans on pockets are at all times each axially aligned with a mandrel and a push rod. The function of the push rods is to push cans supported on the pockets, successively, on the mandrels located at the left of the pockets, preparatory to printing, and then to suctionally engage the printed cans and carry them across the pockets to the right thereof into a position where the cans are placed on a receiving conveyor or chain for subsequent treatment.

Another object of the invention is to provide push rods which are mounted in air cylinders in which the air serves two purposes: one, to urge the push rods in a direction toward the mandrels, and secondly, to yieldingly hold a cam follower against a transfer cam which controls the respective positions of the push rods. This feature is of great advantage in case of malfunction of any part of the mechanism resulting from the presence of a defective or malformed can, as will be explained hereinafter. The reciprocating movement of the push rods is imparted thereto by mechanical means including toggle links, connecting rods, and cam followers, all mounted on one rotatable shaft. The push rods are provided at their free ends with vacuum cups which are connected to a source of vacuum for the purpose of engaging the ends of printed cans and withdrawing them from the mandrels after completion of the printing operation. Thus the suction cup carrying rods serve as push rods for pushing cans from their supporting pockets to mandrels, and serve as suction means for grasping the ends of printed cans and withdrawing them from the mandrels after the completion of the printing. The vacuum lines and the air cylinders are independent of each other.

An important advantage of the invention is the provision of a single rotated shaft on which are mounted the mandrel assembly, the pocket wheel, the push rod carriers and the air cylinder carriers. A transfer cam mounted on a frame controls the movement of the push rods. The described parts permit of long travel of push rods in axial directions whereby they successively push cans from the pockets on to the mandrels located at the left of the pocket wheel for the printing operations, then reverse their direction of travel to withdraw cans from mandrels after they have been printed moving the cans across the pocket wheel to the right thereof (as viewed from the front of the machine), and then again reversing the direction of travel to place the cans on a conveyor or on a chain for subsequent operations thereon.

Heretofore air pressure has been employed in transfer mechanisms to move suction cup carrying rods in one direction to engage cans in a supply line, and to move the rods in the opposite direction to discharge the cans on a receiving conveyor. The length of travel of the rods thus actuated by air pressure is limited. By providing mechanical means for imparting predetermined motions to the cup carrying rods, coupled with air pressure which serves as a gentle force for urging the rods toward the mandrels, and as a yielding force against the controlling transfer cam follower, I am able to move the suction cup carrying rods in axial directions which extend beyond opposite ends of and across the can supporting pockets on which cans are delivered from a supply line for the printing operation and ultimate transfer to receiving mechanism.

The arrangement and location of the can supporting pockets relatively to the mandrels on which the cans are held for the printing operation, together with the relatively long path of travel of the suction cup carrying push rods, are important features which have enabled me to combine the printing operation with the transfer of cans from a supply line to a conveyor after they have been printed. Thus loading, printing and unloading is accomplished by mechanism mounted on a single shaft.

Another object is to provide a continuously rotated printer drum on which are mounted a plurality of blankets on holders which transfer printed matter to cans mounted on mandrels or other holding means which are part of the transfer unit. The blanket holders are segments of the rotatable printer drum, and each blanket holder is pivotally mounted on the drum adjacent the leading edge of the holder, the trailing edge being moved outwardly relatively to the peripheral drum surface by means of a cam and follower. Thus only the outwardly projecting portion of one printing blanket is exposed for contact with a can surface to be printed, and as soon as the can has made rotating contact with the blanket on the cam-actuated blanket holder of the rotated printing drum, the blanket and holder are returned to withdrawn position relatively to the drum, out of contact with the mandrels. Thus the mandrels cannot become contaminated by the ink of the printing blankets.

The printer shaft, on which is mounted the printer drum, is operatively connected to the gearing which drives the transfer unit shaft, whereby the operation of the printer and transfer mechanism can be perfectly timed.

Heretofore, in the event a defective can in the supply line causes malfunction of any mechanism in the transfer unit, it has been necessary to interrupt the operation for the purpose of removing the obstacle, usually located between a suction cup carrying rod and a mandrel. My invention obviates this difficulty. It is an important object and advantage of this invention to provide a continuously running printer and transfer mechanism. The malfunction due to an improperly loaded can does not stop the normal operation of the machine because I have provided means for skipping the operation of certain parts, under such conditions, without interrupting the operation of following parts. Said skipping means include the rendering inactive of a blanket holder segment when that segment is about to print a faulty can or is otherwise obstructed. This is achieved by an electrical signal conveyed to a solenoid which instantly retracts the printer cam and causes the blanket holder to be retracted and become inactive during one printing operation. Said skipping means also include the air pressed transfer cam follower which permits the follower associated with an obstructed push rod to skip the transfer cam until the malfunction has cleared itself, without interruption of the operation of succeeding push rods. A faulty can thus falls away from its push rod when the transfer cam follower contacts the cam at that point where the rod is retracted toward the right of the machine.

Another advantage of the invention is the fact that the loading of cans on to mandrels for the printing operation and the unloading of the printed cans are achieved by a single transfer unit instead of two transfer mechanisms heretofore required.

Another advantage of the invention is the fact that the transfer unit main shaft can be adjusted for printing on either cylindrical or conical surfaces. Such adjustment of the transfer unit main shaft also serves to provide for pressure which may be required on the mandrel shafts to maintain the mandrels and containers held thereon in printing contact with the printing blankets.

Other objects and advantages will become apparent from the drawings and following specification.

In the drawings:

FIG. 1 is a longitudinal vertical sectional view, partly in elevation, of the continuous printer and transfer mechanism embodying my invention, some of the push rods and suction cups thereon having been omitted for sake of clarity. Also omitted are the sprocket and chain which convey printed cans to an oven for subsequent treatment, and the over-coating unit shown in other figures of the drawing.

FIG. 2 is a transverse vertical sectional view in the plane of the line 2—2 of FIG. 1, on an enlarged scale, showing part of the manifold assembly for the vacuum and air to the mandrels.

FIG. 3 is a transverse vertical sectional view in the plane of the line 3—3 of FIG. 1, on an enlarged scale, showing the left face of the pocket wheel which receives cans or other containers from a source of supply, the pocket wheel cam, the open ends of cans and the ends of suction cups, and showing also the sprocket and chain which were omitted from FIG. 1.

Figure 4:
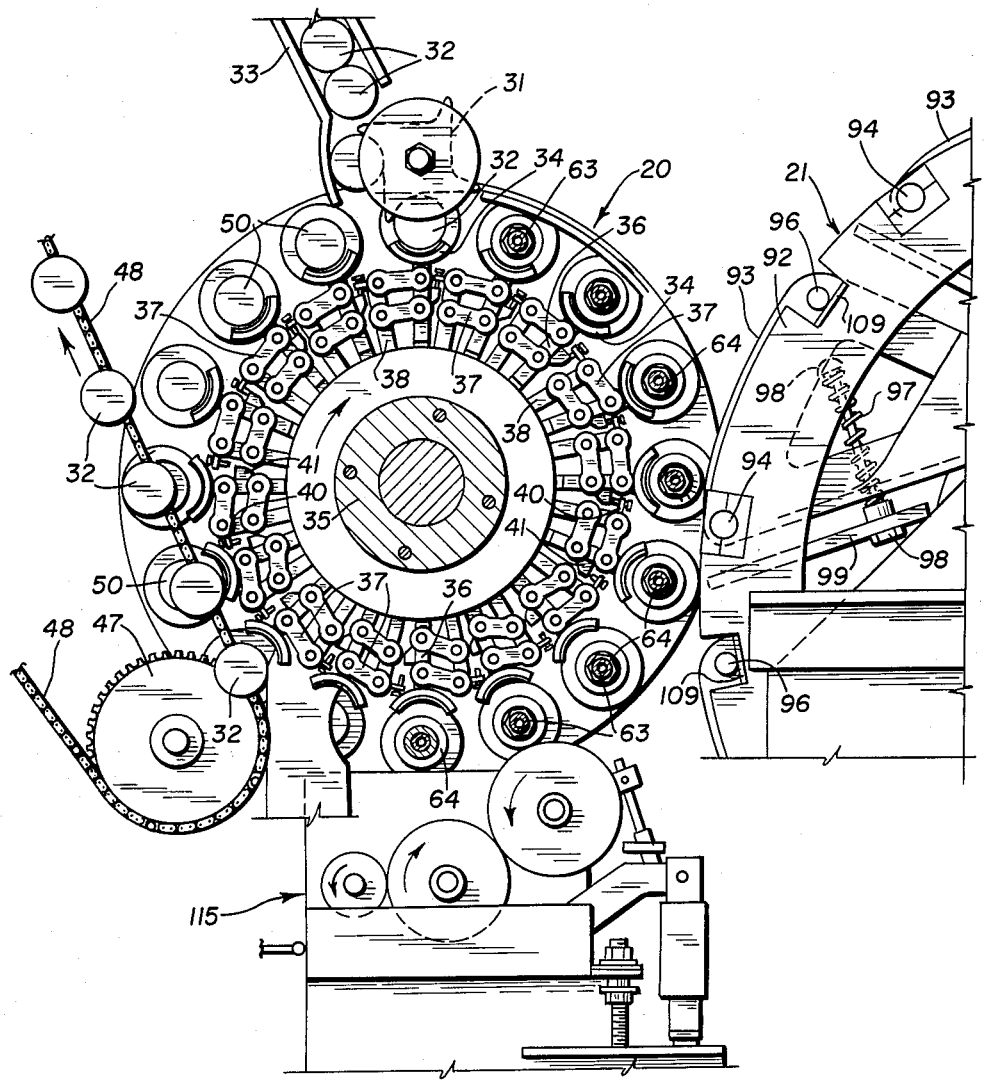

FIG. 4 is a transverse vertical sectional view in the plane of the line 4—4 of FIG. 1, on an enlarged scale, showing the right face of the pocket wheel, the ends of pockets and mandrels, the closed ends of cans, and some of the suction cup carrying push rods in section. An over-coating unit also is shown. In this view the printer is partly broken away.

Figure 5:
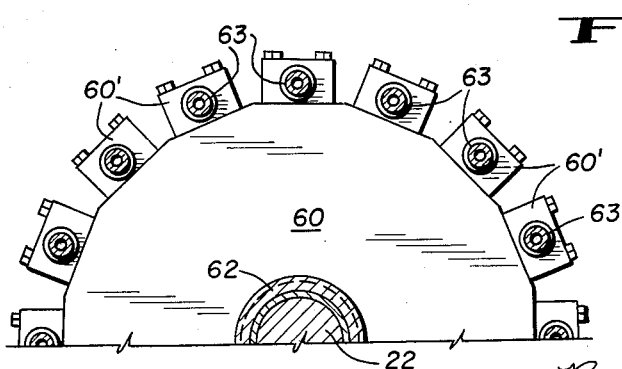

FIG. 5 is a transverse vertical sectional view in the plane of the line 5—5 of FIG. 1, on an enlarged scale, showing the left face of part of the push rod carrier drum.

FIG. 6 is a transverse vertical sectional view in the plane of the line 6—6 of FIG. 1, on an enlarged scale, showing the transfer cam and other transfer mechanism for operating the push rods.

FIG. 7 is a longitudinal vertical sectional view, partly in elevation, in the plane of the line 7—7 of FIG. 6, showing one of the suction cup carrying push rods, a toggle link, connecting rod and cam follower mechanism for actuating the push rods, at the beginning of the loading.

FIG. 8 is a view similar to FIG. 7, in the plane of the line 8—8 of FIG. 6, showing the parts in different positions, in which the suction cup carrying push rod and cup have been moved to the left; one of the can supporting pockets and part of a can being shown in broken lines as they appear when a can has been pushed on a mandrel.

FIG. 9 is a sectional view in the plane of the line 9—9 of FIG. 7 showing the transfer cam follower, can follower pivot and pivot block.

FIG. 10 is a view similar to FIG. 7, in the plane of the line 10—10 of FIG. 6, showing the parts in different positions, in which the suction cup carrying rod and cup have been retracted, toward the right, the cup holding a can shown in broken lines, in position for placement on one of the pegs of a receiving chain which carries printed cans to an oven for subsequent treatment.

FIG. 11 is a view similar to FIG. 7, in the plane of the line 11—11 of FIG. 6, showing the push rod and actuating mechanism as they appear after the rod has been moved toward the left in the advanced position in which the suction cup is ready to grasp another can on a supporting pocket to then be pushed onto a mandrel.

FIG. 12 is an elevational view on an enlarged scale of the right hand end of the transfer unit of FIG. 1.

FIG. 13 is a transverse vertical sectional view of the printer, showing also the ends of cans as they appear when being moved by the mandrels of the transfer unit past the printing blankets of the printer for printing on the cylindrical surfaces of the cans.

FIG. 14 is a sectional view in the plane of the line 14—14 of FIG. 13, showing the pivotal mounting of one of the blanket holder segments of the printer.

FIG. 15 is a sectional view in the plane of the line 15—15 of FIG. 13, on an enlarged scale, showing the cam controlled mounting means for one of the blanket holder segments.

In that embodiment of the invention shown in the drawings, the transfer unit is indicated as a whole at 20 (FIGS. 1 and 4) and the printer as a whole at 21 (FIGS. 4 and 13). A rotatable shaft 22 extends longitudinally and horizontally of the transfer unit 29 in the embodiment shown herein. A bull gear 23 is mounted on a printer shaft 24. The gear 23 is driven by a motor (not shown), and is operatively connected by gearing to the shaft 22.

A mandrel assembly 25, to be described in detail hereinafter, is mounted on the shaft 22 to rotate therewith, and a mandrel gear 26, mounted on the reduced end of the shaft 22, drives a gear 27 on a star wheel shaft 28. A star wheel bracket is indicated at 29, a star wheel bracket hanger at 30, and a star wheel at 31. The star wheel feeds cans 32 from a supply line 33 to pockets 34 of a pocket wheel which has a hub 35 also mounted on the shaft 22. The pockets 34 are arranged in an annular path concentric with the shaft 22 and in vertical alignment with the cans 32 of the supply 33. Each pocket 34 has a stem portion 36 to which are pivotally connected a pair of links 37. The links 37 also are pivotally connected at their opposite ends to link supporting members 38 which extend radially from the pocket wheel hub 35 adjacent each pocket stem 36. As shown in FIG. 3, the stem portions 36 of the pockets 34 are spring mounted at 39 on the hub 35, and the outer ends of the link supporting members 38 are provided with adjusting blocks 40 through which screws may extend for serving as adjustable stops for contacting projections 41 on the stem portions 36 of the pockets to prevent the pockets from moving outwardly radially beyond their intended positions.

Each of the pocket stems 36 is provided with a cam follower 43 which engages the inner edge surface of a crescent shaped cam 44 mounted stationarily on a frame 45. As best shown in FIG. 3, the cam follower 43 causes some of the pockets 34 to be retracted so that the pockets are pulled away from printed cans which then are supported by suction cup carrying rods which grasp the ends of printed cans to withdraw them from mandrels on which they are supported while being printed. The withdrawal carries the printed cans across the pockets without contacting the retracted pockets.

In FIG. 3, a sprocket and peg-chain type of conveyor are indicated as a whole at 46, comprising a sprocket 47 and chain 48. This construction need not be described in detail. The peg-chain is located adjacent the pocket wheel 35 in such position that printed cans 32 are placed on the pegs by suction cup rods after the completion of the printing operation.

Reverting to the mandrel assembly 25, located to the left of the pocket wheel 35 as viewed in FIG. 1, mandrels 50 are rotatably mounted in bearings 51. The mandrels 50 are located in an annular path concentric with the shaft 22, and are axially aligned with the cans 32 when they rest on unretracted pockets 34 as shown at the top of FIG. 4. A conduit 52 connected to a source of vacuum and a conduit 53 connected to a pressurized air supply (FIG. 1) communicate with a mandrel manifold 54 through which vacuum or air is supplied through conduits 55 to the mandrels 50. Vacuum is supplied for the purpose of holding cans on the mandrels during the printing operation, and air is supplied to release the vacuum and facilitate removal of the cans from the mandrels.

Referring now to FIGS. 5–11, inclusive, a push rod carrier drum 60 and integral sleeve 61 are mounted on the shaft 22 by a taper lock bushing 62 to rotate with the shaft. A plurality of push rods 63 provided with suction cups 64 are mounted in bearing blocks 60' on the carrier drum 60 for reciprocating movement toward and away from the mandrels 50, said suction cups being axially aligned with the mandrels. Each push rod 63 is coupled at 65 to a piston rod 66 which extends into an air cylinder 67 mounted in a cylinder block 68. Each rod coupling 65 is pivotally connected to a coupling link 69 which is pivotally connected to a toggle link 70, the latter being pivotally connected to a toggle link block 71 fixed on the sleeve 61. The toggle link 70 is connected to one end of a connecting rod 72 and the rod 72 is pivotally connected at its opposite end to a cam follower pivot 73. The cam follower pivot 73 is pivotally connected to a pivot block 74 fixed on the right hand end of the carrier drum 60. A cam follower 75 is mounted on the cam follower pivot 73 to yieldingly engage a transfer cam 76 best shown in FIGS. 1 and 6.

A conduit 77 is connected to the coupling 65 leading to the interior of each push rod 63 to supply air and vacuum to the suction cups 64. The vacuum supply conduit 78 and air supply 79 communicate with the transfer manifold 80 to supply vacuum to those suction cups 64 which are to grasp and hold cans 32, and to supply air to those cups 64 which are to release cans after placing them on the peg chain 48. An air line 81 supplies air to the air cylinders 67 through air cylinder manifold chamber 82. The transfer rod manifold 80 is stationary and comprises a stationary port plate 80' provided with three holes. Rotation of the push rod carrier drum 60 and associated parts brings the three port plate holes into register with vacuum lines and air lines 78, 79, alternately, so that either vacuum or air is conveyed to three of the rods 63 through conduit 77 to cause the vacuum cups either to hold or release cans. The rest of the rods communicate with atmosphere. The transfer cam drum 83 stationarily supports the manifold 80 and transfer cam 76.

The transfer cam follower 75 is urged against the cam 76 by air pressure from the manifold 82 exerted against the end of the piston rod 66 which is mechanically linked to the cam follower pivot 73.

A pillow block housing is indicated at 84, and a swivel joint at 85. The air line 81 extends through the joint 85.

Referring now to FIGS. 1, 4 and 13–15, a continuously rotating printer 21 comprises a blanket holder drum 90, drum hub 91, plurality of blanket holders 92 and printing blankets 93 mounted on the peripheral surfaces of the holders 92. Each blanket holder is segmental in shape, pivotally mounted near its leading edge in the holder drum 90 by a pivot shaft 94 in bearings 95. The trailing edge of each holder and blanket, mounted on a shaft 96, is free to move outwardly of the holder drum 90, against the tension of spring 97 on retainer 98 attached at one end to the blanket holder and at its other end to a plate 99. The blankets 93 are held on the holders 92 by means of the slotted ratchet shaft 94 and the shaft 96.

A shaft 100 is mounted in the inner end of each holder 92 and a cam follower 101 and cam roller eccentric 102 are mounted on the said shaft. The cam follower 101 engages a cam 103 hingedly mounted at 104 on a frame 105. The upper end of the cam 103 is connected to an air cylinder clevis 106 and air cylinder 107 to which air is conducted through line 108 for the purpose of supplying air pressure against the inner edge of the cam 103. Thus the cam follower 101 is held in cam following position by resilient means, namely, the spring 97, and the cam 103 is air cushioned by air pressure against its inner edge surface. The inward movement of the trailing edge of the blanket on holder 92 is limited by the stop 109.

The cam action is such that one printing blanket 93 is moved outwardly into printing contact with a can while the rest of the blankets are retracted. In the event a deformed can is placed on a mandrel or a can is misplaced relatively to a mandrel, an electrical signal is conveyed to the solenoid 110 which instantly retracts the cam 103 and causes the blanket and its holder to be retracted so that the blanket cannot apply ink to the mandrel or to a faulty can. This action results merely in skipping of one printing operation by one blanket and holder, without interruption of the continued operation.

Plate chucks 111 for placing images on blankets 93 are rotatably mounted on shafts 112 on frames 113 adjacent the periphery of the printer. They receive ink from resiliently mounted rollers 114 as is well understood in the printing art.

After cans 32 have been printed by the printer 21 and before they are placed by the transfer rods 63 on the pegs of the peg chain 48, the printed cans are given an overcoating by the overcoating unit indicated as a whole at 115 in FIG. 4. This mechanism is not new, per se, and therefore need not be described in detail.

It is to be understood that while I have described my combination printer and transfer unit as embodied in the preferred form shown in the drawings, wherein the shaft 22 and printer shaft 24 are horizontally disposed, the said shafts may be vertical shafts, and the parts associated therewith may be rearranged accordingly without departing from the invention.

Further, it is to be understood that if the articles to be printed are cans or cylindrical objects each provided with an open end, it is most convenient to mount the cans on mandrels preparatory to the printing operation, whereas if bottles or closed end objects are to be printed, holding means for grasping the ends of the objects may be substituted for mandrels such as shown herein without departing from the invention.

Therefore, whenever cans are referred to herein, it is to be understood that this word is intended to include cans, bottles, other containers and objects which are to be printed on their outer surfaces; and whenever mandrels are referred to herein it is to be understood that this word includes mandrels such as shown which can be inserted in containers and other objects, as well as other holding devices which suctionally or otherwise grasp and hold articles while being printed.

As shown herein, the blanket holders 92 are pivotally connected to the printer drum near their leading edges, and the trailing edges are free to move outwardly into printing positions relatively to cans. It is to be understood that this arrangement may be reversed so that the trailing edge of the blanket and holder may be pivotally connected to the printer drum and the leading edge may be free to move outwardly of the drum.

The operation of the machine is as follows: Cans 32 arranged in the supply line 33 in axially horizontal position, are guided by the star wheel 31 to pockets 34 of the rotating pocket wheel 35. In this embodiment, the pocket wheel rotates counter clockwise as viewed from the right hand end of the machine as shown in FIGS. 1 and 3. Rotation of the shaft 22, on which the pocket wheel is mounted, also rotates the mandrel assembly 25 and the push rod carrier drum 60 and associated parts. Sixteen each of the mandrels 50 and push rods 63 are axially aligned with each other and with cans 32 which rest on unretracted pockets 34.

As shown at the top of FIG. 4, the star wheel 31 has guided a can on to a pocket 34. The clockwise rotation of the pocket wheel 35 carries the can to the right and downwardly where it is engaged by the cup end of a push rod 63 and pushed on a mandrel 50 located to the left of the pocket wheel as view in FIG. 1. The mandrel assembly 25 also rotates clockwise as viewed from the right hand end of the machine, and carries the can into printing position relatively to the printer drum and blankets is shown in FIG. 13, where the blanket 93 in contact with a can 32 is shown in dotted lines as it appears when the blanket holder has been moved outwardly by the cam 103 into printing position.

Again referring in FIG. 4, it will be noted that as soon as the can has been printed, the pocket wheel cam 44 causes retraction of the pocket 34 which supported the can before it was placed on a mandrel 50, whereupon the push rod cup 64 suctionally engages the end of the printed can and withdraws it from the mandrel by moving the printed can to the right of FIG. 1, across the retracted pocket and beyond the pocket wheel. When the can carrying push rod reaches the limit of its stroke to the right (at the same time moving clockwise downwardly to the lower left of FIG. 4), the direction of movement is again reversed, toward the left of FIG. 1, and clockwise for placement of the can on a peg of the chain 48. The movement in axial directions of each push rod which takes place in one cycle or rotation of the transfer mechanism consists of three phases, i.e., a half stroke to the left for loading a can on a mandrel, a full stroke to the right for carrying a can from the mandrel across and beyond the pocket wheel, and a half stroke to the left for unloading. These movements are illustrated in FIG. 8, where a can has been moved from a pocket to a mandrel; in FIG. 10, where a can has been moved from a mandrel across the pocket and beyond the pocket wheel; and in FIG. 11 after the can has been placed on the peg chain 48, and the push rod is ready to continue its movement to the left to move another can from a pocket to a mandrel.

From the foregoing it will be understood that only one can on a mandrel is being printed at one time, while additional cans are progressively and successively moving through the described cycle into loading, printing and unloading positions through the coordinated rotation of the mandrel assembly, pocket wheel, and transfer mechanism, and the reciprocatory movements of the push rods.

The operation is continuous and is not interrupted by malfunction or faulty loading of a can. As explained, this highly desirable result is achieved by the yielding engagements between the printer cam 103 and its follower, and between the transfer cam 76 and its follower, which permit temporary disengagement of these parts and automatic correction of the malfunction.

It will be further understood that my novel printer construction, including the retractable blanket holders herein described, makes possible continuous operation as distinguished from intermittent operation of the machine. However, my transfer unit may be used with printers other than the one shown and described herein, and in such case the transfer mechanism and pocket wheel function as herein described, whether the shaft 22 is rotated continuously or intermittently.

In describing the invention, reference has been had to a particular example embodying the same, but I wish it to be understood that the invention is not limited to the construction shown in the drawing and that various changes may be made in the general arrangement and construction of parts without departing from the invention.

I claim:

1. A combination printer and transfer unit in which cans are loaded, printed and unloaded, comprising
   (a) a mandrel assembly including a plurality of rotatable concentrically located mandrels arranged in an annular path,
   (b) a pocket wheel including a plurality of radially retractable pockets arranged in an annular path adjacent the mandrels, each pocket when unretracted being axially aligned with a mandrel,
   (c) transfer mechanism including a plurality of push rods each axially aligned with an unretracted pocket and with a mandrel,
   (d) a supply line delivering cans successively to the pockets,
   (e) a rotated transfer unit shaft on which said mandrel assembly, pocket wheel and transfer mechanism are mounted to rotate therewith,
   (f) a printer rotatably mounted peripherally adjacent the mandrel assembly for printing contact with cans positioned on the mandrels, and
   (g) means moving said push rods across said pockets in one direction to push cans from the pockets to the mandrels and moving said push rods across retracted pockets in the opposite direction to withdraw printed cans from the mandrels.

2. The printer and transfer unit defined by claim 1, in which the pocket wheel comprises
   (a) a pocket wheel hub,
   (b) radially extending link supporting members on the hub,
   (c) a stem on each pocket,
   (d) links pivotally connecting each stem to a supporting member, and
   (e) cam controlled means connected to the pocket stems for retracting the pockets after cans have been pushed from the pockets and placed on mandrels.

3. The printer and transfer unit defined by claim 2, in which the cam controlled means comprise
   (a) a stationary cam mounted adjacent the pocket wheel hub, and
   (b) cam followers on the pocket stems engaging said cam.

4. The printer and transfer unit defined by claim 2, which includes
   (a) a spring between the wheel hub and each pocket wheel stem urging the pockets radially outwardly,
   (b) an adjustable stop on each link supporting member, and
   (c) a stop contacting projection on each pocket stem.

5. The printer and transfer unit defined by claim 1, in which the transfer mechanism comprises
   (a) a carrier which rotates with the shaft and in which the push rods are reciprocably mounted,
   (b) a stationary cam adjacent one end of the carrier,
   (c) a plurality of cam followers pivotally mounted on the carrier, (d) linkage pivotally connecting each cam follower to a push rod,
(e) a plurality of air cylinders mounted on the carrier,
(f) a piston rod in each air cylinder connected to a push rod,
(g) a conduit conducting air under pressure to the air cylinders, and
(h) means between each piston rod and a cam follower whereby the cam follower is yieldingly urged against the cam by the air pressed piston rod.

6. The printer and transfer unit defined by claim 5 which includes
(a) a transfer manifold mounted adjacent the push rod carrier,
(b) air and vacuum conduits communicating with the manifold and with the interior of the push rods, and
(c) a suction cup on each push rod communicating with the interior of the rod;
said vacuum being applied to a suction cup when a push rod is in can grasping and withdrawing positions and said air being applied to a suction cup when a push rod reaches can unloading position.

7. A combination printer and transfer unit in which cans are loaded, printed and unloaded in a continuous operation, comprising
(a) a mandrel assembly including a plurality of rotatable concentrically located mandrels arranged in an annular path,
(b) a pocket wheel including a plurality of radially retractable pockets arranged in an annular path adjacent the mandrels, each pocket when unretracted being axially aligned with a mandrel,
(c) transfer mechanism including a plurality of push rods each axially aligned with an unretracted pocket and with a mandrel,
(d) a supply line delivering cans successively to the pockets,
(e) a continuously rotated transfer unit shaft on which said mandrel assembly, pocket wheel and transfer mechanism are mounted to rotate therewith,
(f) a printer rotatably mounted adjacent the mandrel assembly for printing contact with cans positioned on the mandrels, and
(g) means moving said push rods across said pockets in one direction to push cans from the pockets to the mandrels and moving said push rods across retracted pockets in the opposite direction to withdraw printed cans from the mandrels, said printer comprising
(f-1) a blanket holder drum,
(f-2) a printer shaft parallel to said transfer unit shaft and operatively connected thereto, said drum being mounted on the printer shaft to rotate therewith,
(f-3) a plurality of segmental blanket holders each having a peripheral blanketed portion and an inner end,
(f-4) means pivotally connecting one transverse end of each peripheral portion to said drum, the opposite end being free,
(f-5) a cam follower mounted on the inner end of each holder, and
(f-6) a cam mounted for engagement by the cam followers, whereby the free end of a peripheral portion of one holder is moved outwardly into printing position relatively to a can on a mandrel while the remaining holders are retracted relatively to the drum.

8. The printer and transfer unit defined by claim 7, in which the leading edge of the peripheral portion of each blanket holder is pivotally connected to the blanket holder drum and the trailing edge is free, said printer including resilient means attached to each blanket holder and drum urging said trailing portions inwardly relatively to the drum.

9. The printer and transfer unit defined by claim 7, which includes means for retracting the cam and rendering a blanket holder inactive for printing purposes when a malfunction of the transfer unit occurs, comprising
(a) a frame support adjacent the holder drum,
(b) means pivotally connecting the cam at one of its ends to said support,
(c) an air cylinder on the support connected to the other end of the cam, and
(d) a solenoid actuated by a signal received in response to a malfunction of the transfer mechanism for retracting the cam.

10. A combination printer and transfer unit in which cans are loaded, printed and unloaded in a continuous operation, comprising
(a) a mandrel assembly,
(b) transfer mechanism for placing cans on mandrels and for withdrawing cans from mandrels,
(c) a continuously rotated transfer unit shaft on which said mandrel assembly and transfer mechanism are mounted to rotate therewith, and
(d) a printer rotatably mounted adjacent the mandrel assembly for printing contact with cans positioned on the mandrels comprising
(d-1) a blanket holder drum,
(d-2) a printer shaft substantially parallel to the transfer unit shaft and operatively connected thereto, said drum being mounted on the printer shaft to rotate therewith,
(d-3) a plurality of blanket holders each having a peripheral blanketed portion and an inner end,
(d-4) means pivotally connecting one transverse end of each peripheral portion to said drum, the opposite end being free, and
(d-5) means cooperating with the inner ends of the holders for moving the free end of a peripheral portion of one holder outwardly into printing position relatively to a can on a mandrel while the remaining holders are retracted relatively to the drum.

11. The printer and transfer unit defined by claim 10 in which the means cooperating with the inner ends of the holders for moving the free end of a peripheral portion of one holder outwardly into printing position comprises
(a) a cam follower on each holder,
(b) a frame support adjacent the holder drum,
(c) a cam pivotally mounted on the support for engagement by the cam followers, and
(d) means for retracting the cam.

12. A combination printer and transfer unit which comprises transfer mechanism for loading cans on mandrels and unloading the cans, comprising
(a) a rotated transfer unit shaft,
(b) a carrier mounted to rotate with the shaft,
(c) a plurality of push rods reciprocably mounted in the carrier,
(d) a stationary cam adjacent one end of the carrier,
(e) a plurality of cam followers pivotally mounted on the carrier,
(f) linkage pivotally connecting each cam follower to a push rod,
(g) a plurality of air cylinders mounted on the carrier,
(h) a piston rod in each air cylinder connected to a push rod,
(i) a conduit conducting air under pressure to the air cylinders, and
(j) means between each piston rod and cam follower whereby the cam follower is yieldingly urged against the cam by the air pressed piston rod.

13. The printer and transfer unit defined by claim 12, in which the transfer mechanism includes
(a) a transfer manifold mounted adjacent the push rod carrier,
(b) air and vacuum conduits communicating with the manifold and with the interior of the push rods, and (c) a suction cup on each push rod communicating with the interior of the rod;

said vacuum being applied to a suction cup when a push rod is in can grasping and withdrawing positions and said air being applied to a suction cup when a push rod reaches can unloading position.

14. A combination printer and transfer unit which comprises a pocket wheel having a plurality of radially retractable pockets on which cans are loaded for transfer to mandrels, said wheel comprising (a) a pocket wheel hub,
(b) radially extending link supporting members on the hub,
(c) a stem on each pocket,
(d) links pivotally connecting each stem to a supporting member, and
(e) cam controlled means connected to the pocket stems for retracting the pockets.

15. An article handling machine comprising
(a) a plurality of holders for receiving articles,
(b) a pocket wheel including a plurality of radially retractable pockets, each pocket when unretracted being axially aligned with a holder,
(c) transfer mechanism including a plurality of push rods each axially aligned with an unretracted pocket and with a holder, and
(d) means moving said push rods across said pockets in one direction to push articles from the pockets to the holders and moving said push rods across retracted pockets in the opposite direction to withdraw articles from the holders.

References Cited by the Examiner
UNITED STATES PATENTS

| | | |
|---|---|---|
| 2,175,560 | 10/1939 | Friden _____ 101—38 |
| 2,244,651 | 6/1941 | Goebel et al. |
| 3,115,091 | 12/1963 | Hakogi _____ 101—40 |

ROBERT E. PULFREY, Primary Examiner.

WILLIAM McCARTHY, Assistant Examiner.